(12) United States Patent
Rodriguez

(10) Patent No.: US 11,451,021 B2
(45) Date of Patent: Sep. 20, 2022

(54) ELECTRICAL CONDUIT SPACING DEVICE

(71) Applicant: Adrian Rodriguez, San Angelo, TX (US)

(72) Inventor: Adrian Rodriguez, San Angelo, TX (US)

( * ) Notice: Subject to any disclaimer, the term of this patent is extended or adjusted under 35 U.S.C. 154(b) by 154 days.

(21) Appl. No.: 16/882,463

(22) Filed: May 23, 2020

(65) Prior Publication Data

US 2021/0367411 A1   Nov. 25, 2021

(51) Int. Cl.
*G01B 5/02* (2006.01)
*G01B 5/16* (2006.01)
*H02G 3/04* (2006.01)
*G01C 9/28* (2006.01)

(52) U.S. Cl.
CPC ............. *H02G 3/0406* (2013.01); *G01B 5/02* (2013.01); *G01B 5/16* (2013.01); *G01C 9/28* (2013.01)

(58) Field of Classification Search
CPC .......... H02G 3/0406; G01B 5/02; G01B 5/16; G01C 9/28
See application file for complete search history.

(56) References Cited

U.S. PATENT DOCUMENTS

| | | | | |
|---|---|---|---|---|
| 2,582,606 A * | 1/1952 | Riddle | ...................... | B25H 7/00 33/667 |
| 5,657,548 A * | 8/1997 | Kellar, Sr. | ........... | E04G 21/1833 33/1 H |
| 6,622,395 B1 * | 9/2003 | Hickey | ................... | B25H 7/005 33/452 |
| 7,159,328 B1 * | 1/2007 | Duda | ........................ | B25H 7/04 33/370 |
| 7,661,201 B1 * | 2/2010 | Hordis | ...................... | H02G 3/12 33/528 |
| 8,336,221 B2 * | 12/2012 | Steele | ........................ | G01C 9/28 33/528 |
| 8,832,949 B2 * | 9/2014 | Allen | ......................... | E06B 1/04 33/194 |
| 8,881,417 B2 * | 11/2014 | Sano | ......................... | G01B 5/24 33/512 |
| 8,919,076 B1 * | 12/2014 | Kitchens | .................. | E04F 21/22 52/747.11 |
| 9,032,637 B2 * | 5/2015 | Propp | ....................... | B25H 7/04 33/613 |
| 10,731,961 B2 * | 8/2020 | Trent | ......................... | G01B 3/32 |
| 2007/0277388 A1 * | 12/2007 | Murphy | ................. | H02G 3/123 33/528 |

(Continued)

*Primary Examiner* — Yaritza Guadalupe-McCall
(74) *Attorney, Agent, or Firm* — The Iwashko Law Firm, PLLC; Lev Ivan Gabriel Iwashko

(57) ABSTRACT

An electrical conduit spacing device to organize spacing of an electrical conduit at a predetermined location, the electrical conduit spacing device including a main body, a plurality of magnetic portions disposed on a first side of the main body and a second side of the main body opposite with respect to the first side to attract the electrical conduit thereto, a plurality of measuring sticks perpendicularly disposed on at least a portion of a bottom surface of the main body with respect to a direction to indicate a distance of a space between the electrical conduit, and another object or surface, and a butterfly nut disposed on at least a portion of the main body to move at least one of the plurality of measuring sticks in response to movement of the butterfly nut.

7 Claims, 2 Drawing Sheets

(56) References Cited

U.S. PATENT DOCUMENTS

| | | | | |
|---|---|---|---|---|
| 2012/0255186 A1* | 10/2012 | Allen | ............... | E06B 1/04 33/194 |
| 2013/0118022 A1* | 5/2013 | Propp | ............... | B25H 7/04 33/669 |
| 2016/0128497 A1* | 5/2016 | Marks | ............... | A47G 1/205 33/666 |
| 2021/0367411 A1* | 11/2021 | Rodriguez | ............... | G01B 5/02 |

* cited by examiner

ELECTRICAL CONDUIT SPACING DEVICE

BACKGROUND

1. Field

The present general inventive concept relates generally to a spacing device, and particularly, to an electrical conduit spacing device.

2. Description of the Related Art

An electrical conduit is an essential tool utilized to protect and create a route for electrical wiring in a building and/or structure. However, the electrical conduit does not operate on its own or without assistance from a person in charge of installing the electrical conduit. Often times, the person installing the electrical conduit lays additional electrical conduits on top of one another creating a poor aesthetic, as well as prolonging the time to move on to extra work projects.

Furthermore, improper spacing of the electrical conduit can result in wasted space and/or a need to redo the installation.

Therefore, there is a need for an electrical conduit spacing device that facilitates spacing of each electrical conduit.

SUMMARY

The present general inventive concept provides an electrical conduit spacing device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electrical conduit spacing device to organize spacing of an electrical conduit at a predetermined location, the electrical conduit spacing device including a main body, a plurality of magnetic portions disposed on a first side of the main body and a second side of the main body opposite with respect to the first side to attract the electrical conduit thereto, a plurality of measuring sticks perpendicularly disposed on at least a portion of a bottom surface of the main body with respect to a direction to indicate a distance of a space between the electrical conduit, and another object or surface, and a butterfly nut disposed on at least a portion of the main body to move at least one of the plurality of measuring sticks in response to movement of the butterfly nut.

At least one of the plurality of magnetic portions may include a ruler to measure a distance between two points.

The electrical conduit spacing device may further include a measuring stick groove disposed on at least a portion of the bottom surface of the main body to receive the plurality of measuring sticks therein.

A length of the measuring stick groove may correspond to a length of the ruler.

The plurality of measuring sticks may include a movable measuring stick perpendicularly disposed within the measuring stick groove to move within the measuring stick groove from a first position to at least partially toward a second position, and a fixed measuring stick perpendicularly disposed at an end of the measuring stick groove.

The butterfly nut may rotate in a first direction to tighten the butterfly nut, such that the at least one of the plurality of measuring sticks is prevented from movement, and rotates in a second direction to loosen the butterfly nut, such that the at least one of the plurality of measuring sticks is movable.

The electrical conduit spacing device may further include a plurality of bubble levels disposed on at least a portion of a top surface of the main body to identify a position of the main body with respect to an external surface.

The electrical conduit spacing device may further include an illumination unit disposed within at least a portion of the main body to illuminate a first color in response to the at least one of the plurality of measuring sticks being in a first lateral position, and illuminate a second color in response to the at least one of the plurality of measuring sticks being in a second lateral position.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
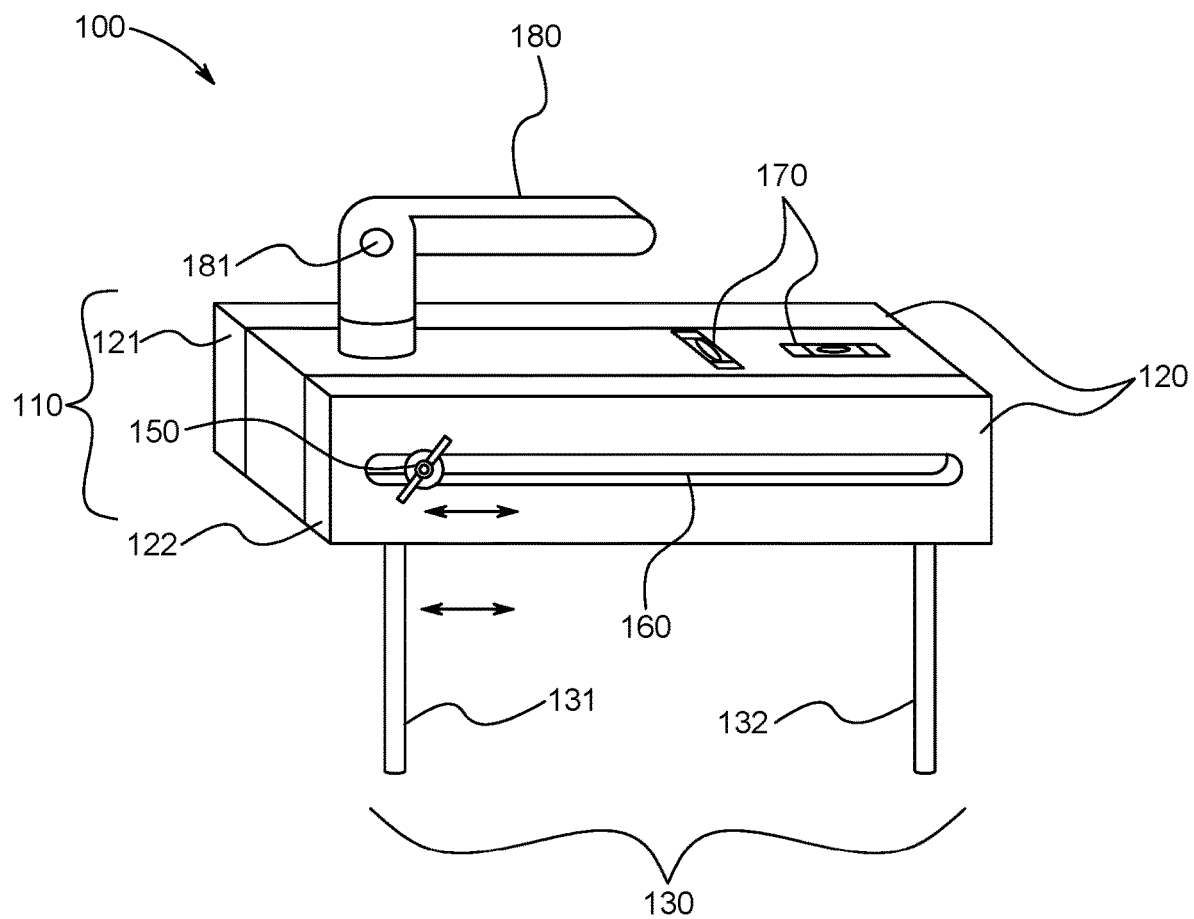
FIG. 1 illustrates a top perspective view of an electrical conduit spacing device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Electrical Conduit Spacing Device 100
Main Body 110
Magnetic Portions 120
First Magnetic Portion 121
Ruler 121*a*
Second Magnetic Portion 122
Measuring Sticks 130
Movable Measuring Stick 131
Fixed Measuring Stick 132
Measuring Stick Groove 140
Butterfly Nut 150
Butterfly Nut Groove 160
Bubble Levels 170
Handle 180
Button 181
Illumination Unit 190

FIG. 1 illustrates a top perspective view of an electrical conduit spacing device 100, according to an exemplary embodiment of the present general inventive concept.

Figure 2:
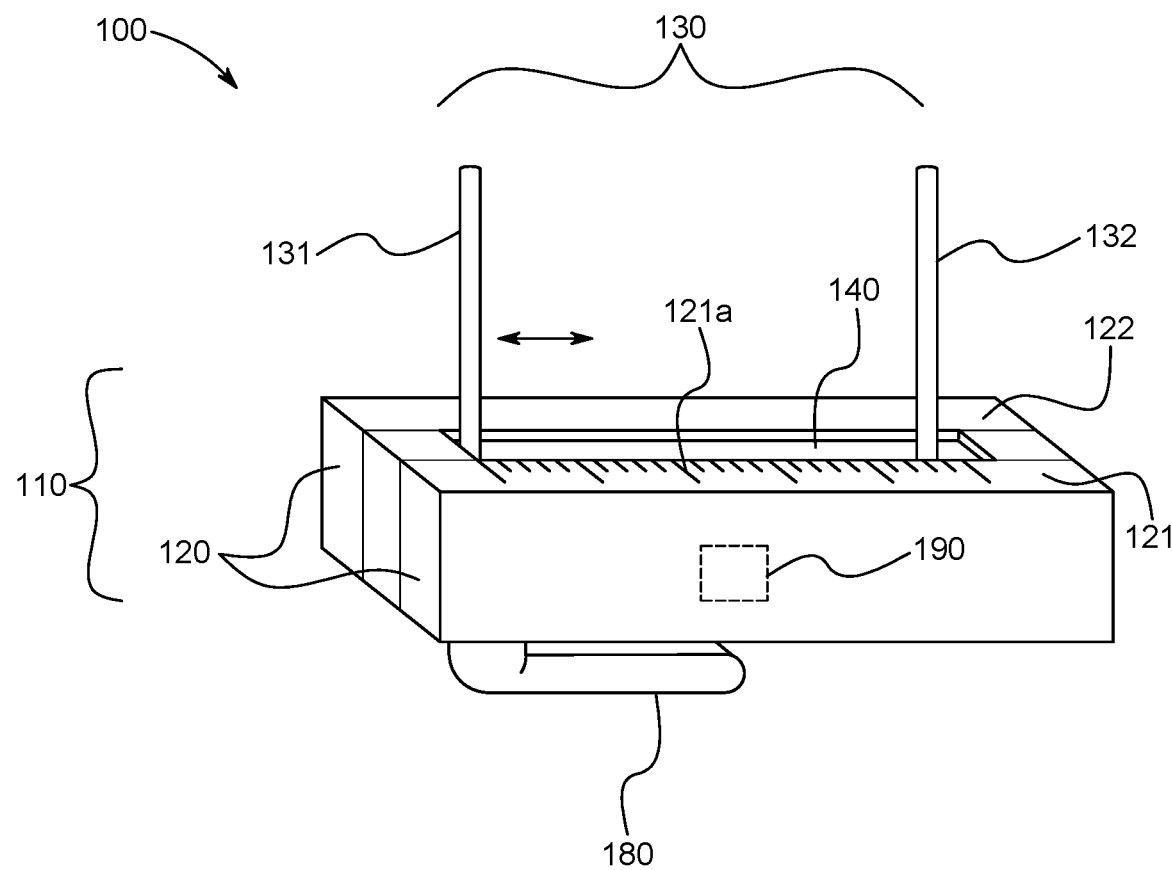
FIG. 2 illustrates a bottom perspective view of the electrical conduit spacing device, according to an exemplary embodiment of the present general inventive concept.

FIG. 2 illustrates a bottom perspective view of the electrical conduit spacing device 100, according to an exemplary embodiment of the present general inventive concept.

The electrical conduit spacing device 100 may be constructed from at least one of metal, plastic, wood, ceramic, glass, and rubber, etc., but is not limited thereto.

Referring to FIGS. 1 and 2, the electrical conduit spacing device 100 may include a main body 110, a plurality of magnetic portions 120, a plurality of measuring sticks 130, a measuring stick groove 140, a butterfly nut 150, a butterfly nut groove 160, a plurality of bubble levels 170, a handle 180, and an illumination unit 190, but is not limited thereto.

Referring again to FIGS. 1 and 2, the main body 110 is illustrated to have a rectangular prism shape. However, the main body 110 may be rectangular, circular, conical, pentagonal, hexagonal, heptagonal, octagonal, or any other shape known to one of ordinary skill in the art, but is not limited thereto.

The main body 110 may have a predetermined size to facilitate placement of an electrical conduit (not illustrated) on and/or within a predetermined location, such as a building, underground, and/or any surface. For example, the predetermined size of the main body 110 may include a length of nine inches, a width of two inches, and/or a height of two inches.

The plurality of magnetic portions 120 may include a first magnetic portion 121 and a second magnetic portion 122, but is not limited thereto.

The first magnetic portion 121 may be disposed on and/or within at least a portion of a first side of the main body 110. Moreover, a length of the first magnetic portion 121 may at least partially extend the length of the main body 110. Similarly, the second magnetic portion 122 may be disposed on and/or within at least a portion of a second side of the main body 110 opposite with respect to the first side of the main body 110. A length of the second magnetic portion 122 may at least partially extend the length of the main body 110.

The first magnetic portion 121 and/or the second magnetic portion 122 may receive at least one ferromagnetic material (not illustrated) thereupon, such as the electrical conduit and/or any other metal pipe. In other words, the first magnetic portion 121 and/or the second magnetic portion 122 may attract the at least one ferromagnetic material thereto, such that the first magnetic portion 121 and/or the second magnetic portion 122 may prevent the ferromagnetic material from falling off without a predetermined level of force applied to the ferromagnetic material, such as pushing and/or pulling by a user.

Referring to FIG. 2, the first magnetic portion 121 may include a ruler 121*a*, but is not limited thereto.

The ruler 121*a* may be disposed on and/or within at least a portion of the first magnetic portion 121. As such, the ruler 121*a* may be engraved, embedded, and/or attached via an adhesive substrate on and/or within the first magnetic portion 121. The ruler 121*a* may be aligned with an area, a space, and/or a surface to measure a distance between two points. More specifically, the ruler 121*a* may measure the space between the electrical conduit and/or another object or surface.

Referring again to FIG. 2, although, the ruler 121*a* is illustrated to be disposed on the first magnetic portion 121. However, the ruler 121*a* may be disposed on the second magnetic portion 122 and/or any other surface of the main body 110.

The plurality of measuring sticks 130 may include a movable measuring stick 131 and a fixed measuring stick 132, but is not limited thereto.

The measuring stick groove 140 may be disposed on and/or within at least a portion of a bottom surface of the main body 110. More specifically, the measuring stick groove 140 may be disposed on at least a portion of a center portion of the main body 110.

Also, the measuring stick groove 140 may be recessed with respect to the bottom surface of the main body 110, such that the measuring stick groove 140 may be considered an aperture. A length of the measuring stick groove 140 may correspond to a length of the ruler 121*a*.

The plurality of measuring sticks 130 may be perpendicularly disposed within the measuring stick groove 140 away from the measuring stick groove 140 with respect to a direction. In other words, the measuring stick groove 140 may receive the plurality of measuring sticks 130 therein. Also, each of the plurality of measuring sticks 130 may have a predetermined length, such as extending three inches away from the measuring stick groove 140.

Referring again to FIG. 2, the movable measuring stick 131 may move (i.e. slide) from a first position (e.g., a first end of the measuring stick groove 140) to at least partially toward a second position (e.g., e.g., a second end of the measuring stick groove 140 and/or the fixed measuring stick 132). Also, the movable measuring stick 131 may move from the second position to at least partially toward the first position. As such, the movable measuring stick 131 may indicate a distance of the space between the electrical conduit and/or another object and/or another surface corresponding to a measured length on the ruler 121a. As such, the movable measuring stick 131 may be used to provide the distance of the space for the electrical conduit during installation. In other words, the movable measuring stick 131 may allow the user to place the electrical conduit in an organized manner.

The fixed measuring stick 132 may remain at the second end of the measuring stick groove 140, such that the fixed measuring stick 132 may not move away from the second end of the measuring stick groove 140. Alternatively, the fixed measuring stick 132 may move in a manner similar to the movable measuring stick 131, such that the movable measuring stick 131 and/or the fixed measuring stick 132 may move toward and/or away from each other.

The butterfly nut 150 may be disposed on at least a portion of the butterfly nut groove 160. Additionally, the butterfly nut 150 may move (i.e. slide) from a first position (e.g., a first end of the butterfly nut groove 160) to at least partially toward a second position (e.g., a second end of the butterfly nut groove 160). Moreover, the movable measuring stick 131 may move in response to movement of the butterfly nut 150, such that the movable measuring stick 131 may be positioned based on a position of the butterfly nut 150 within the butterfly nut groove 160.

Furthermore, the butterfly nut 150 may be rotatably disposed within the butterfly nut groove 160. As such, the butterfly nut 150 may rotate in a first direction (i.e. clockwise) or a second direction (i.e. counterclockwise) to tighten and/or lock the butterfly nut 150, such that the butterfly nut 150 and/or the movable measuring stick 131 may remain in a fixed position. Alternatively, the butterfly nut 150 may rotate in the second direction or the first direction to loosen and/or unlock the butterfly nut 150, such that the butterfly nut 150 and/or the movable measuring stick 131 may move within the butterfly nut groove 160 and/or the measuring stick groove 140, respectively.

Each of the plurality of bubble levels 170 may include a cylindrical container, but is not limited thereto.

The plurality of bubble levels 170 may be disposed on at least a portion of a top surface of the main body 110. The plurality of bubble levels 170 may also be referred to as a single bubble level 170. Each of the plurality of bubble levels 170 may contain a bubble within the cylindrical container having fluid therein. Moreover, each of the plurality of bubble levels 170 may be used to identify a position of the main body 110 with respect to an external surface, such that the main body 110 may be oriented in a planar position with respect to the external surface. In other words, the plurality of bubble levels 170 may facilitate leveling the main body 110 upon the external surface, such that the user may identify when the main body 110 is in a desired position and/or angle.

The handle 180 may include a button 181, but is not limited thereto.

The handle 180 may be disposed on at least a portion of the top surface of the main body 110. The handle 180 may facilitate gripping thereof. As such, the main body 110 may move in response to movement of the handle 180, such that the plurality of measuring sticks 130 may be positioned according to a preference of the user.

The illumination unit 190 may include a light and a power source, but is not limited thereto. The power source may include a battery and a solar cell, but is not limited thereto.

The illumination unit 190 may be disposed on and/or within at least a portion of the main body 110, the plurality of measuring sticks 130, and/or the measuring stick groove 140. In other words, the illumination unit 190 may illuminate at least a portion of the main body 110, the plurality of measuring sticks 130, and/or the measuring stick groove 140. Moreover, the illumination unit 190 may turn on and/or turn off in response to depressing the button 181 on the handle 180.

The illumination unit 190 may change in color based on a lateral position of the movable measuring stick 131 with respect to the ruler 121a. For example, the illumination unit 190 may illuminate a first color in response to the movable measuring stick 131 being at a first lateral position and illuminate a second color in response to the movable measuring stick 131 being at a second lateral position. As such, the illumination unit 190 may indicate to the user the position of the measurable moving stick 131 with respect to the ruler 121a.

Therefore, the electrical conduit spacing device 100 may organize spacing of the electrical conduit at the predetermined location.

The present general inventive concept may include an electrical conduit spacing device 100 to organize spacing of an electrical conduit at a predetermined location, the electrical conduit spacing device 100 including a main body 110, a plurality of magnetic portions 120 disposed on a first side of the main body 110 and a second side of the main body 110 opposite with respect to the first side to attract the electrical conduit thereto, a plurality of measuring sticks 130 perpendicularly disposed on at least a portion of a bottom surface of the main body 110 with respect to a direction to indicate a distance of a space between the electrical conduit, and another object or surface, and a butterfly nut 150 disposed on at least a portion of the main body 110 to move at least one of the plurality of measuring sticks 130 in response to movement of the butterfly nut 150.

At least one of the plurality of magnetic portions 120 may include a ruler 121a to measure a distance between two points.

The electrical conduit spacing device 100 may further include a measuring stick groove 140 disposed on at least a portion of the bottom surface of the main body 110 to receive the plurality of measuring sticks 130 therein.

A length of the measuring stick groove 140 may correspond to a length of the ruler 121a.

The plurality of measuring sticks 130 may include a movable measuring stick 131 perpendicularly disposed within the measuring stick groove 140 to move within the measuring stick groove 140 from a first position to at least partially toward a second position, and a fixed measuring stick 132 perpendicularly disposed at an end of the measuring stick groove 140.

The butterfly nut 150 may rotate in a first direction to tighten the butterfly nut 150, such that the at least one of the plurality of measuring sticks 130 is prevented from movement, and rotates in a second direction to loosen the butterfly nut 150, such that the at least one of the plurality of measuring sticks 130 is movable.

The electrical conduit spacing device 100 may further include a plurality of bubble levels 170 disposed on at least a portion of a top surface of the main body 110 to identify a position of the main body 110 with respect to an external surface.

The electrical conduit spacing device 100 may further include an illumination unit 190 disposed within at least a portion of the main body 110 to illuminate a first color in response to the at least one of the plurality of measuring sticks 130 being in a first lateral position, and illuminate a second color in response to the at least one of the plurality of measuring sticks 130 being in a second lateral position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An electrical conduit spacing device to organize spacing of an electrical conduit at a predetermined location, the electrical conduit spacing device comprising:
   a main body;
   a plurality of magnetic portions disposed on a first side of the main body and a second side of the main body opposite with respect to the first side to attract the electrical conduit thereto;
   a measuring stick groove disposed on at least a portion of the bottom surface of the main body;
   a plurality of measuring sticks perpendicularly disposed within at least a portion of the measuring stick groove with respect to a direction to indicate a distance of a space between the electrical conduit, and another object or surface, the plurality of measuring sticks comprising:
      a movable measuring stick perpendicularly disposed within the measuring stick groove to move within the measuring stick groove from a first position to at least partially toward a second position, and
      a fixed measuring stick perpendicularly disposed at an end of the measuring stick groove; and
   a butterfly nut disposed on at least a portion of the main body to move at least one of the plurality of measuring sticks in response to movement of the butterfly nut.

2. The electrical conduit spacing device of claim 1, wherein at least one of the plurality of magnetic portions comprises:
   a ruler to measure a distance between two points.

3. The electrical conduit spacing device of claim 2, wherein a length of the measuring stick groove corresponds to a length of the ruler.

4. The electrical conduit spacing device of claim 1, wherein the butterfly nut rotates in a first direction to tighten the butterfly nut, such that the at least one of the plurality of measuring sticks is prevented from movement, and rotates in a second direction to loosen the butterfly nut, such that the at least one of the plurality of measuring sticks is movable.

5. The electrical conduit spacing device of claim 1, further comprising:
   a plurality of bubble levels disposed on at least a portion of a top surface of the main body to identify a position of the main body with respect to an external surface.

6. The electrical conduit spacing device of claim 1, further comprising:
   an illumination unit disposed within at least a portion of the main body to illuminate a first color in response to the at least one of the plurality of measuring sticks being in a first lateral position, and illuminate a second color in response to the at least one of the plurality of measuring sticks being in a second lateral position.

7. An electrical conduit spacing device to organize spacing of an electrical conduit at a predetermined location, the electrical conduit spacing device comprising:
   a main body;
   a plurality of magnetic portions disposed on a first side of the main body and a second side of the main body opposite with respect to the first side to attract the electrical conduit thereto;
   a plurality of measuring sticks perpendicularly disposed on at least a portion of a bottom surface of the main body with respect to a direction to indicate a distance of a space between the electrical conduit, and another object or surface;
   a butterfly nut disposed on at least a portion of the main body to move at least one of the plurality of measuring sticks in response to movement of the butterfly nut; and
   an illumination unit disposed within at least a portion of the main body to illuminate a first color in response to the at least one of the plurality of measuring sticks being in a first lateral position, and illuminate a second color in response to the at least one of the plurality of measuring sticks being in a second lateral position.

* * * * *